Feb. 19, 1924.
H. C. MALLORY
THERMOSTATIC VALVE
Filed June 7, 1916
1,483,902
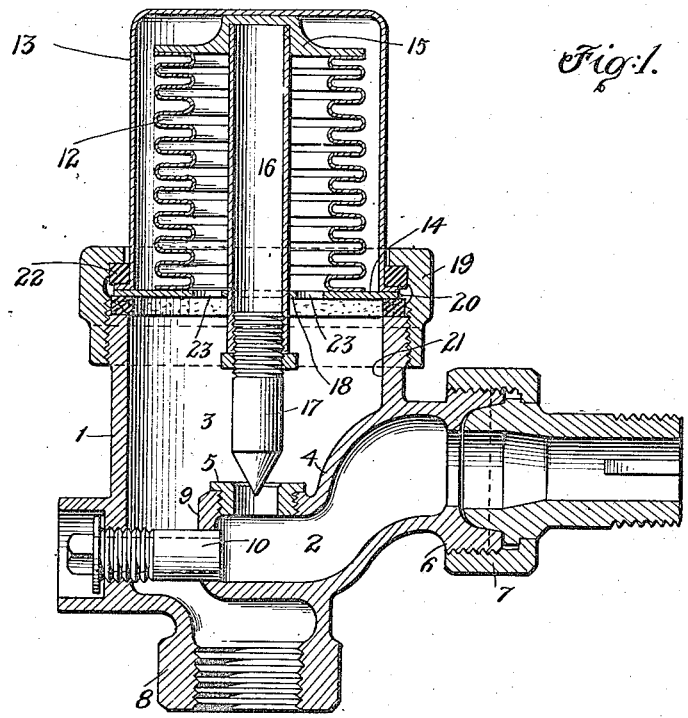
Fig. 1.
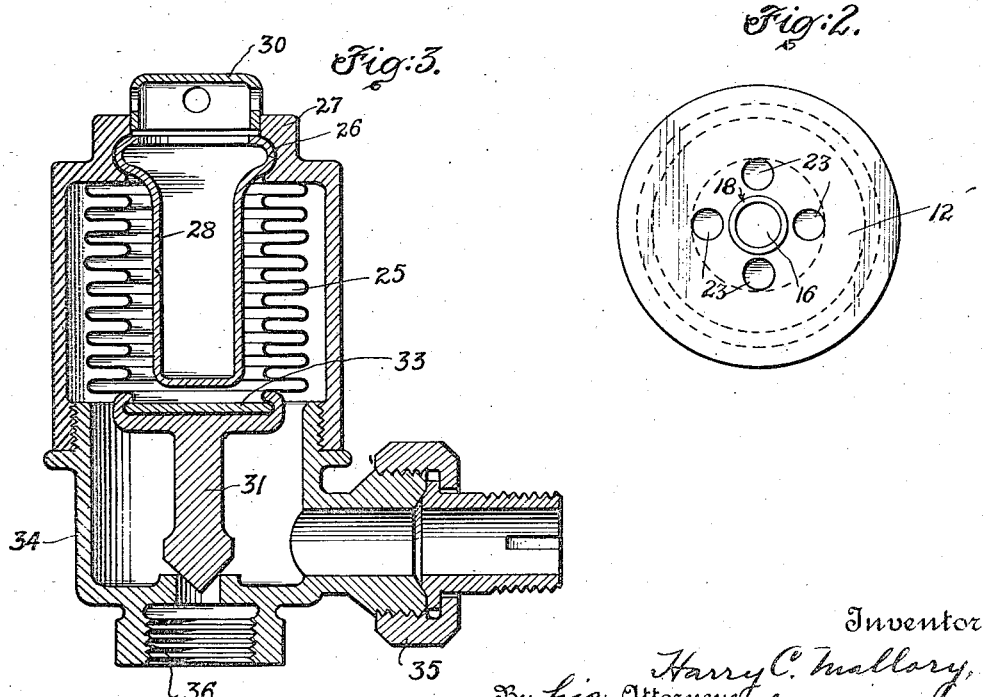
Fig. 3.
Fig. 2.
Inventor
Harry C. Mallory,
By his Attorneys
Edwards, Sager & Wooster.

Patented Feb. 19, 1924.

1,483,902

UNITED STATES PATENT OFFICE.

HARRY C. MALLORY, OF BELLPORT, NEW YORK.

THERMOSTATIC VALVE.

Application filed June 7, 1916. Serial No. 102,115.

*To all whom it may concern:*

Be it known that I, HARRY C. MALLORY, a citizen of the United States, residing at Bellport, in the county of Suffolk and State of New York, have invented certain new and useful Improvements in Thermostatic Valves, of which the following is a full, clear, and exact specification.

This invention relates to improvements in thermostatic valves and more particularly to steam traps in which the valve for permitting escape of water is operated by a thermosensitive element, and has for its object to secure more frequent discharge of the trap by enabling more rapid cooling of the thermo-sensitive element.

It has heretofore been the practice to provide steam traps having a thermostat for operating the discharge valve, with a thermostatic element located in a compartment of the steam trap so as to be surrounded by the steam, water or other fluid within the trap. In such traps the thermo-sensitive element is influenced wholly by the temperature of the contents of the compartment surrounding the thermostat, and is not directly influenced by the external atmosphere. The thermostat is usually set to close the valve at a predetermined temperature, such as the temperature of steam when the device is used for a steam trap, and to open the valve when the surrounding temperature falls below the predetermined point, as for example when water of condensation, or air, or both, collects in the trap. Under the latter conditions in traps as heretofore constructed, the cooling operation of the thermostat, and the consequent opening of the valve, is delayed by the continued high temperature of the stratum of fluid surrounding the thermostat. The principal object of the invention is to secure the more rapid cooling of the thermostatic element and the more rapid discharge of the relatively low temperature fluids. To this end the thermostatic element to move the valve is exposed on one side to the temperature within the trap, and on the other side is in direct contact with the atmosphere. The thermo-sensitive element is therefore in the most advantageous position to be rapidly cooled by the surrounding air. Thus a cold room will be warmed up more quickly, owing to more frequent actuation of the valve.

While my improvement is primarily designed for use in connection with steam traps to actuate the opening and closing of a valve, it may be used in any device where power is transmitted by use of a thermostat by the alternate application of heating agents.

In order that the invention may be readily understood, reference will be had to the accompanying drawings which are designed merely as an illustration to assist the description of the invention and not as defining the limits thereof except as stated in the claims.

In the drawings,

Figure 1 is a view in central vertical section showing my improvement in connection with a steam trap;

Figure 2 is a detail view of one of the elements, and

Figure 3 shows a modification.

Referring to the drawings, 1 is a casing of a steam trap which is divided into a receiving chamber 2 and a delivery chamber 3 by means of a partition 4 provided with a valve seat 5, which as here illustrated is formed by a screw-threaded nipple adapting it to be replaced when worn out. The casing of the trap is provided with a screw-threaded inlet connection 6 which is adapted to receive a coupling 7 for connecting the trap with a source of steam such as a steam radiator, not shown. The trap casing on the delivery side of the partition 4 has a screw-threaded outlet 8 for the escape of water which condenses in the heating system and gravitates to the receiving chamber 2. For the purpose of removing dirt accumulations in chamber 2, a discharge opening 9 is provided therein which may be closed by a key operated plug 10 inserted through the wall of casing 1 and held in place by a threaded engagement with the portion of the wall through which it passes. The steam trap above described is old, but it has been described in detail to enable my improvement to be better understood in its relation to such old structures.

My improvement as illustrated in the drawings, Fig. 1, comprises an inner collapsible and extensible vessel 12 and an outer plain vessel or casing 13 adapted to confine a volatile liquid around the inner vessel, the walls of the outer vessel being thin and of metal whereby radiation of heat from the vapor to the surrounding atmosphere may be facilitated. One end of the collapsible and extensible vessel is made fast to a plate 14 which forms one end closure for the annular compartment holding the volatile liquid, the opposite end of the collapsible and extensible vessel is movable and closed by a rigid plate 15 to which is made fast a valve-stem 16 provided with a valve 17 adapted to be adjusted on the stem 16, the latter being long enough to extend through a guide opening 18 centrally located in plate 14. The thermostat casing 13 is mounted on the trap casing 1 in position to enable the valve 17 to register with the valve seat 5, and may be secured in place by a nut 19 taking over a flange 20 on the casing wall and in threaded engagement with an extension 21 of the trap casing. In order to limit the transfer of heat by conduction from the valve casing 21 to the external casing 13 and also to make a tight joint, washers 22 preferably made of some material having low heat conductivity and sufficient mechanical strength, such as compressed fiber, are interposed between these members. This feature has been described and claimed in my United States Patent 988,727 of April 4, 1911. Free communication between the inner space of the collapsible and extensible vessel and the steam space 3 of the trap is had through openings 23 in plate 14.

The thermostatic element therefore comprises a double walled cylindrical vessel the inner corrugated wall 12 being in contact with one operating fluid in the form of hot water or steam in the trap, and the outer wall 13 being in contact with another operating fluid which in the specific example shown is the atmosphere.

Fig. 3 illustrates a further application of my invention, in this case to a thermostat steam trap such as is designed for use in connection with vacuum heating systems. In this case the flexible element employed is of the bellows type as shown at 25 and has its open end secured in a groove 26 in the valve bonnet 27 by means of the tubular shaped member 28 which projects in the diaphragm and is provided with an expanded portion 29 entering the groove 26 and exerting pressure on the end of the flexible vessel to maintain it in position. The lower end acts as a stop for the movable end of the bellows. A perforated metal cap 30 opening freely to the atmosphere is placed over the member 28 to prevent dirt from entering the interior and at the same time permit free circulation of air. A valve stem 31 is secured to the closed end of the collapsible vessel by being knurled around the closed end of the bellows over the interior reinforcement 33. The valve body 34 is connected to the radiator by means of a union 35, and has a threaded connection 36 to the escape or the return pipe.

Any volatile liquid may be used for charging the annular space of the thermostat such as alcohol, gasoline or other liquid well known for such purpose.

In describing the operation of the device, it is assumed that the trap is connected with a source of steam which is subject to the cooling influence of a surrounding medium such as the atmosphere. With the parts in position as illustrated and adjusted in Figure 1, the movable end wall 15 has lifted valve 17 to permit the discharge of water and air trapped in chamber 2. The atmosphere surrounding casing 13 then cools and condenses the vapor in the annular space of the thermostat 12 and reduces the pressure on the outside of the collapsible and extensible vessel to a point at which the resiliency of the walls causes the vessel to extend and lift the valve 17. By reason of the same cooling influences, condensation of steam in the steam pipes connected with the trap has occurred and the water of condensation has gravitated to the receiving chamber 2 of the trap and escapes through the open port. In the present form of device very little accumulation of water occurs in the chamber 2 by reason of the quick response of the annular chamber of the thermostat to cooling by the surrounding atmosphere and immediate opening of the discharge valve. The period of open position is short. Steam enters the interior of the collapsible and expansible vessel, past port 5 and quickly heats the volatile liquid in the outer annular chamber thereby raises the vapor pressure sufficiently to collapse the vessel and seat the valve which will now remain seated only so long as the vapor tension in the annular space counteracts the tendency of the vessel to extend lengthwise. By reason of the structural arrangement and particularly the exposure of the thermostat to the cooling effect of the atmosphere the vapor in the thermostat is permitted to begin parting at once with its heat and therefore to relieve its pressure on the flexible element which in consequence raises the valve to open position. It will thus be seen that the valve is enabled to open even before the steam in the inner space ceases to impart heat to the contents of the thermostatic element. This vibratory movement of the vessel follows the alternate heating and cooling of the annular space containing the volatile liquid and the frequency of its vibrations is materially increased by the annular form of what may be termed the working chamber and its exposure to the direct cooling influence of the atmosphere. With the old arrangement in which the steam space surrounded the thermostatic element the valve waited upon the condensation of practically all the steam in this space before moving into open position thereby causing sluggish action of the trap.

In Figure 3, the heat of the steam in the space between the outside of the bellows and the casing keeps the bellows expanded and the valve seated. When water of condensation collects and cuts off the access of steam to the bellows, the latter cools very rapidly owing to its inner wall 28 being directly in contact with the external atmosphere, thereby allowing the bellows to collapse and open the valve to discharge the water. The new steam immediately heats up the bellows and closes the valve.

By reason of the wide range of travel of this type of thermostat, the valve is enabled to be adjusted at the factory and operates under all working conditions for which the device is designed without requiring further adjustment when installed or during subsequent use.

This application is a continuation in part of my application Serial No. 627,794, filed May 17, 1911, and in part of my application Serial No. 833,593, filed April 22, 1914.

Having thus described my invention, I declare that what I claim as new and desire to secure by Letters Patent, is:—

1. In combination in a trap for a heating fluid, a cylindrical vessel having an open and a closed end wall, an annular wall around the open end, a corrugated vessel of generally cylindrical shape exposed to the heating fluid within said first mentioned vessel and having one end engaging said annular wall, a disc wall closing the other end of said corrugated vessel and adapted to rest against the closed end of said first mentioned vessel, a valve stem carried by said disc wall and lying axially within the same, a valve carried by said valve stem and formed with a valve engaging portion for self centering on a cooperating valve seat, and a valve seat with which said valve cooperates.

2. In a combination in a trap for a heating fluid, a heating fluid chamber having an inlet and a centrally disposed valve seat, a movable disc, a corrugated tubular bellows rigidly fastened at one end to said chamber, and at its other end to said movable disc and having its surface in contact with said heating fluid, a valve member cooperating with said seat and rigidly attached to said movable disc, and a rigid wall connected to said chamber and exposed to a cooling fluid, and forming with said bellows a cylindrical thermostatic chamber, substantially as specified.

3. In combination in a trap for a heating fluid, a generally cylindrical heating fluid chamber having an inlet and an outlet and a central valve seat, a valve cooperating with said valve seat and actuated by a thermostat comprising a corrugated tubular bellows having one end rigid with said chamber and its surface in contact with an annular body of the heating fluid, a tubular wall rigid with said chamber and forming with said bellows an enclosed annular thermostatic chamber, and means rigidly connecting said valve with a movable portion of said bellows.

4. In an apparatus of the character described the combination of a casing with a thermostatic element responsive to the combined action of a heating fluid and the surrounding air to be influenced thereby, and comprising an annular expansible-collapsible vessel serving to confine an expansible medium and having an extensible wall exposed directly to said heating fluid, and a rigid wall exposed directly to said surrounding air, and a valve actuated by the extensible wall of said thermostatic element for controlling said heating fluid, substantially as specified.

5. In an apparatus of the character described, the combination of a casing having an inlet, an outlet, and a valve seat intermediate said inlet and said outlet, with a thermostatic element secured to said casing and responsive to the combined action of a heating fluid, and the surrounding air to be influenced thereby, and comprising an annular expansible-collapsible vessel serving to confine a volatile fluid and having an extensible wall exposed directly to said heating fluid, and a rigid wall exposed directly to said surrounding air, and a valve carried by the extensible wall of said thermostatic element adapted to seat upon the valve seat in said casing whereby to control said heating fluid in response to the operations of said thermostatic element, substantially as specified.

6. The combination of a collapsible extensible corrugated sheet metal vessel of generally cylindrical shape, the corrugations therein extending circumferentially having a stationary end wall provided with openings and an opposite rigid movable end wall, a rigid exterior wall exposed to the atmosphere and confining a volatile liquid exterior to said vessel, a valve stem fast to said movable wall and working through said stationary end wall, a valve on said stem, and a steam port for admitting steam to the interior of said vessel and controlled by the said valve.

7. In combination, an annular cylindrical vessel bounded by inner and outer generally cylindrical walls, the outer wall being plain and the inner wall corrugated, each wall being completely closed across at one end, an annular wall connecting them at the other end, a guide carried by said annular wall, a valve stem passing through said guide and connected to the opposite end of the corrugated wall, a valve carried on said stem, and a valve seat to cooperate therewith.

In testimony whereof I affix my signature.

HARRY C. MALLORY.